Figure 9:
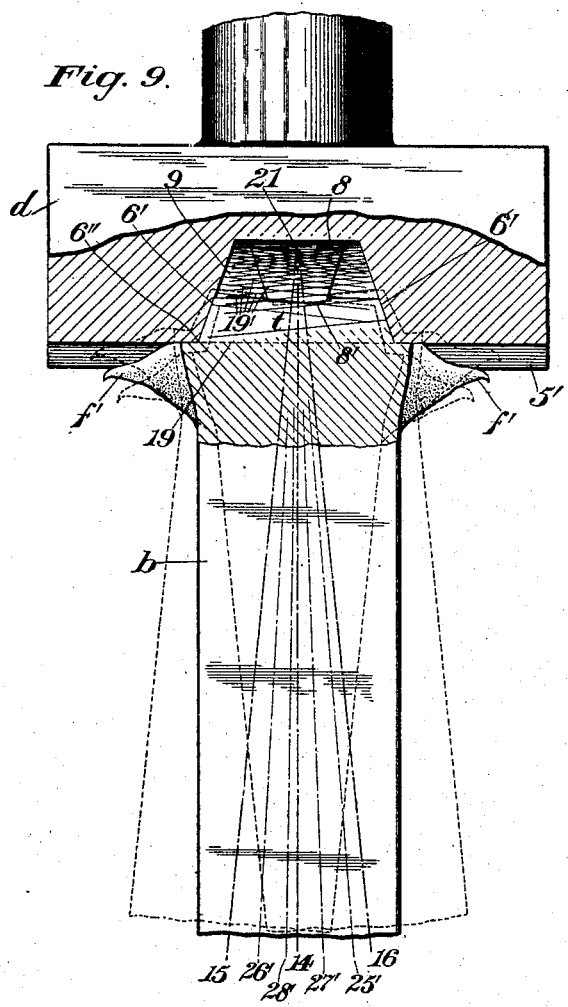

F. H. RICHARDS.
ART OF MAKING TYPES AND TYPE BARS.
APPLICATION FILED DEC. 16, 1899.
919,215.
Patented Apr. 20, 1909.
8 SHEETS—SHEET 1.
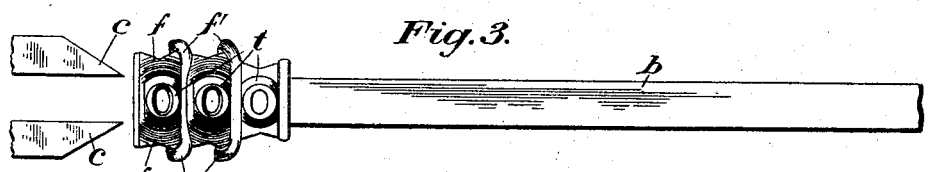
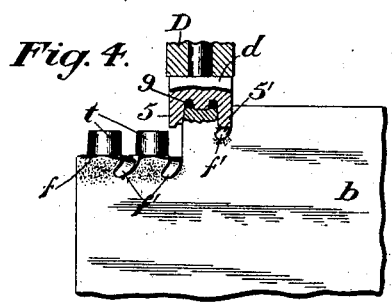
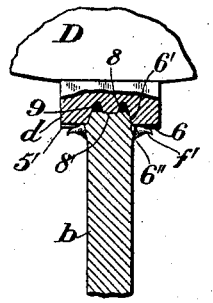
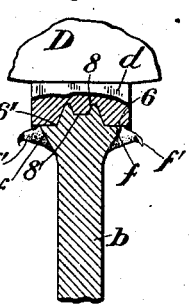
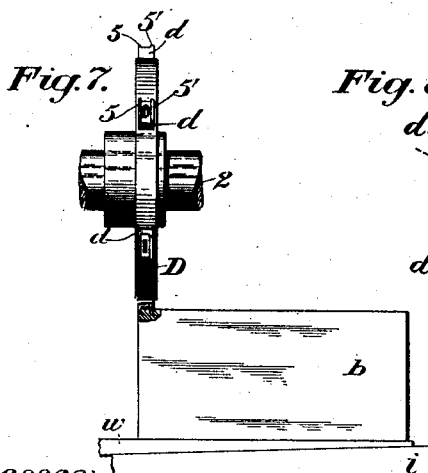
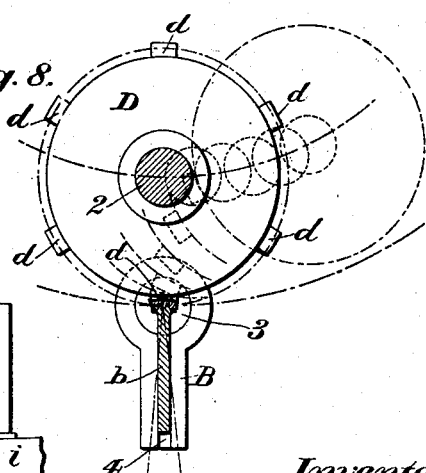
Witnesses:
J. L. Edwards Jr.
Inventor:
F. H. Richards F. H. RICHARDS.
ART OF MAKING TYPES AND TYPE BARS.
APPLICATION FILED DEC. 16, 1899.

919,215.

Patented Apr. 20, 1909.
8 SHEETS—SHEET 2.

Witnesses:

Inventor:

F. H. RICHARDS.
ART OF MAKING TYPES AND TYPE BARS.
APPLICATION FILED DEC. 16, 1899.
919,215.
Patented Apr. 20, 1909.
8 SHEETS—SHEET 3.
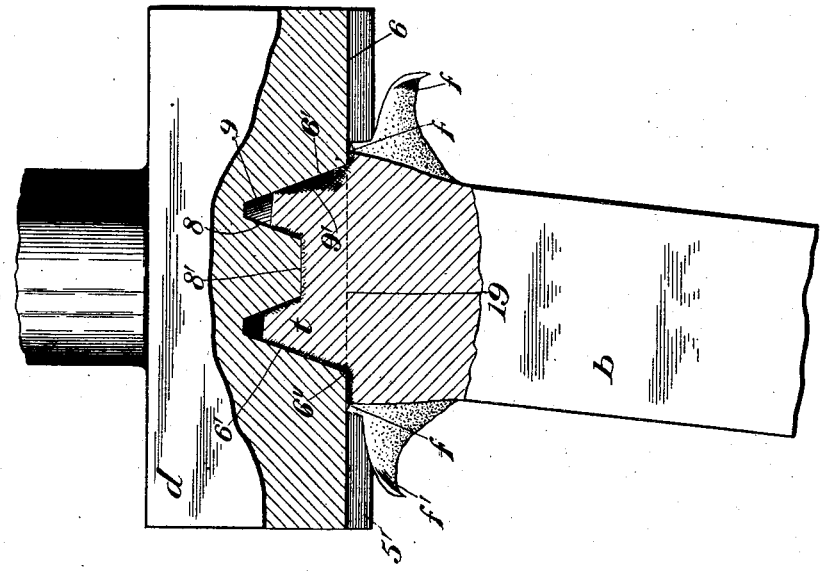
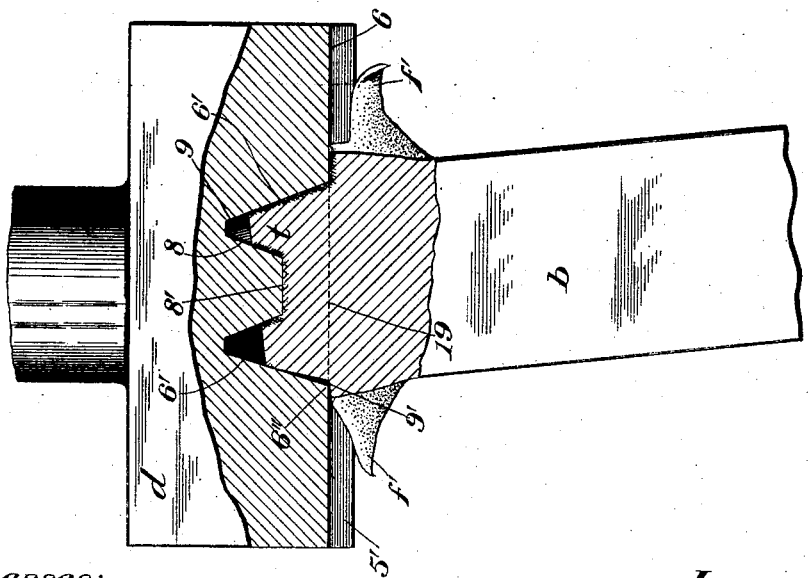

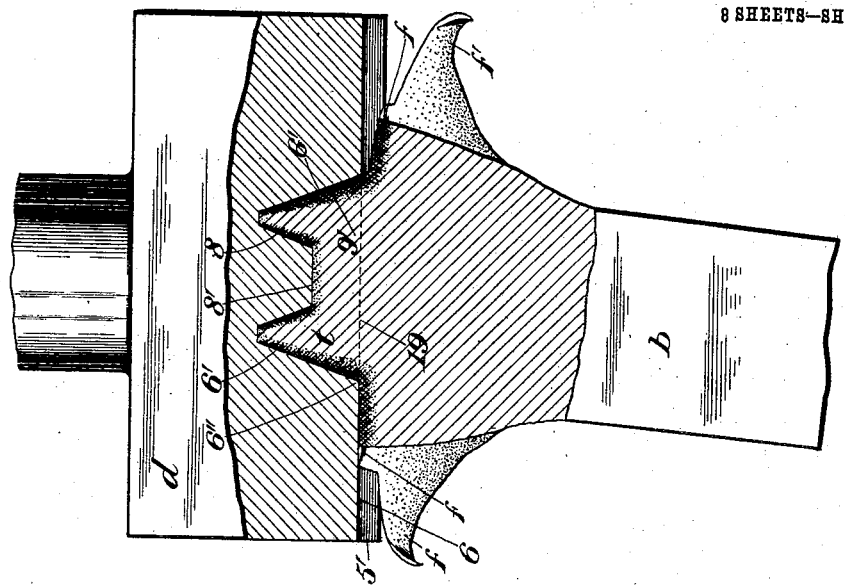
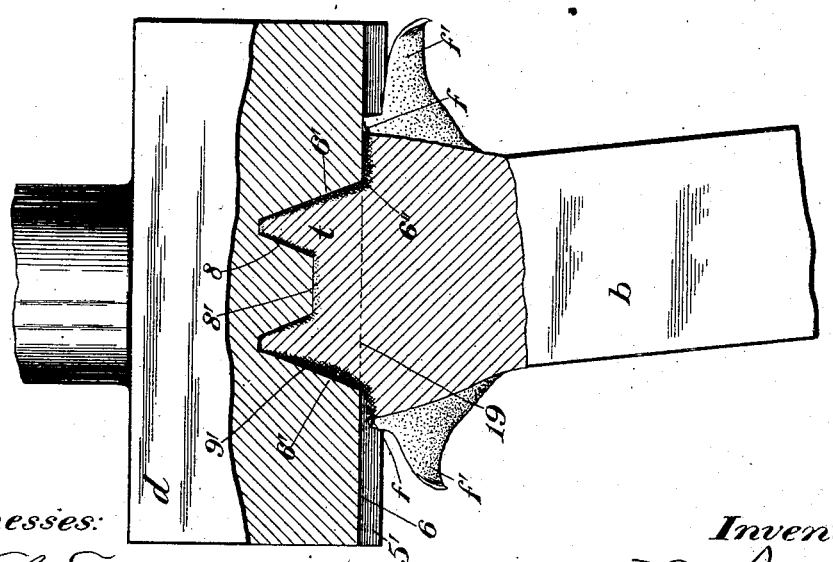

F. H. RICHARDS.
ART OF MAKING TYPES AND TYPE BARS.
APPLICATION FILED DEC. 16, 1899.
919,215.
Patented Apr. 20, 1909.
8 SHEETS—SHEET 5.
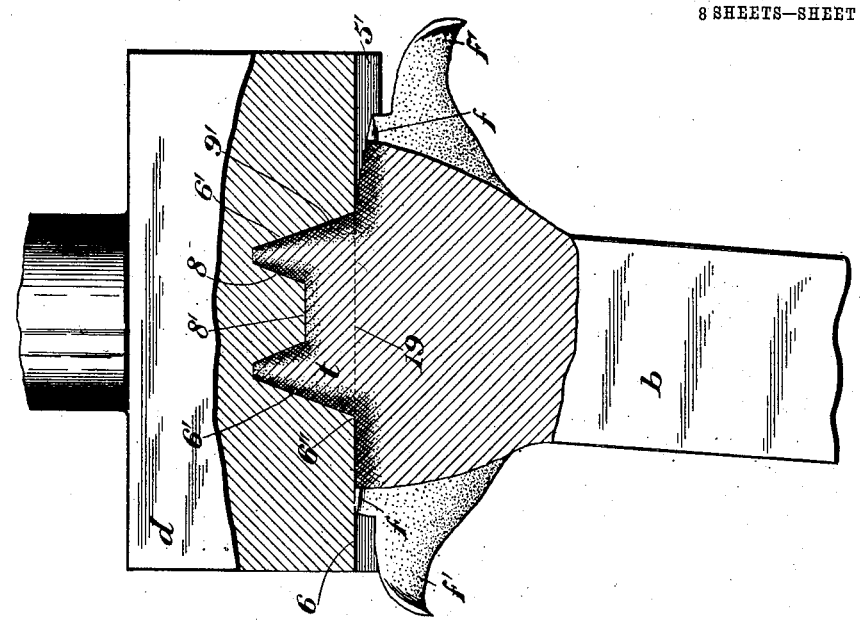
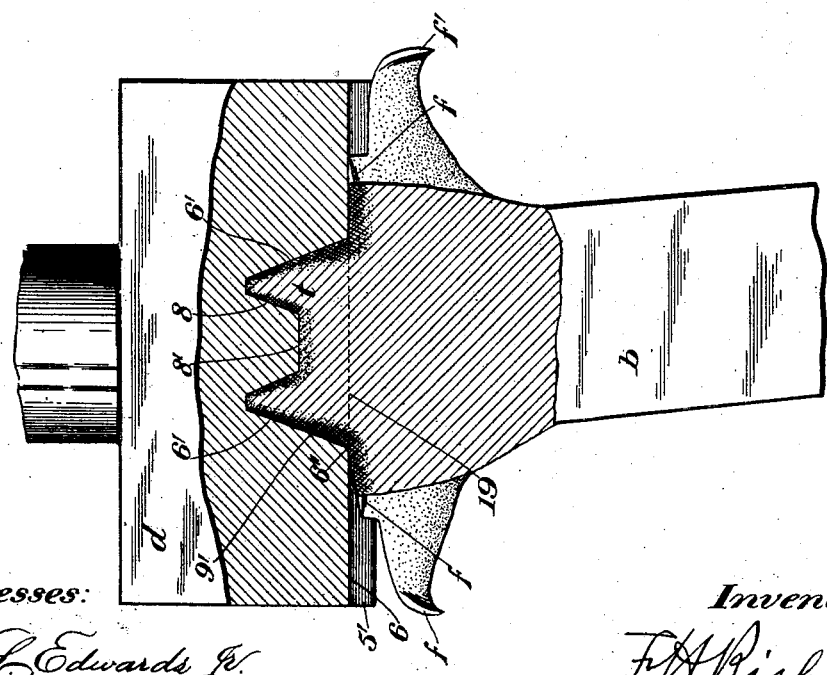
Witnesses:
Inventor:

F. H. RICHARDS.
ART OF MAKING TYPES AND TYPE BARS.
APPLICATION FILED DEC. 16, 1899.
919,215.
Patented Apr. 20, 1909.
8 SHEETS—SHEET 6.
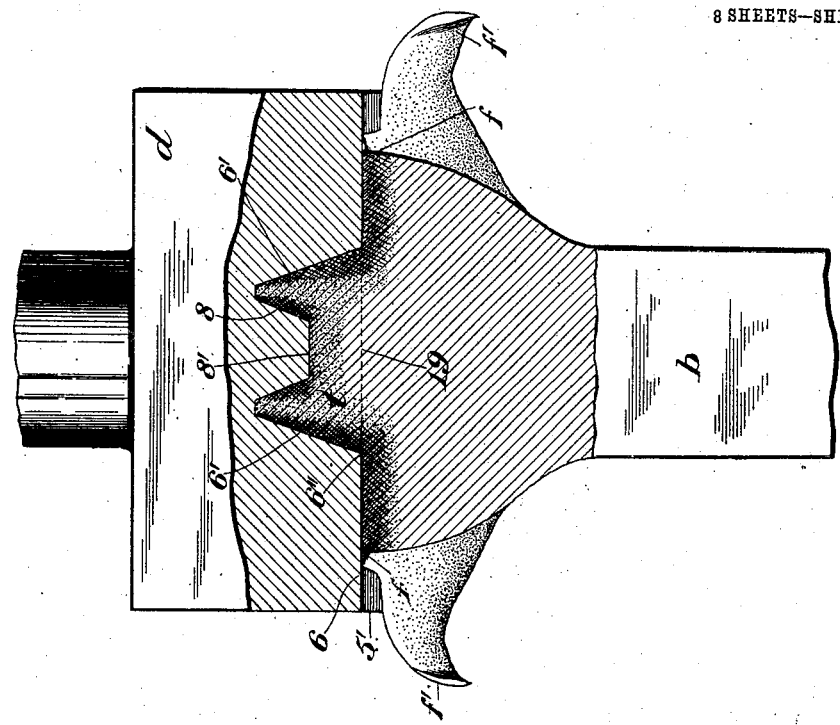
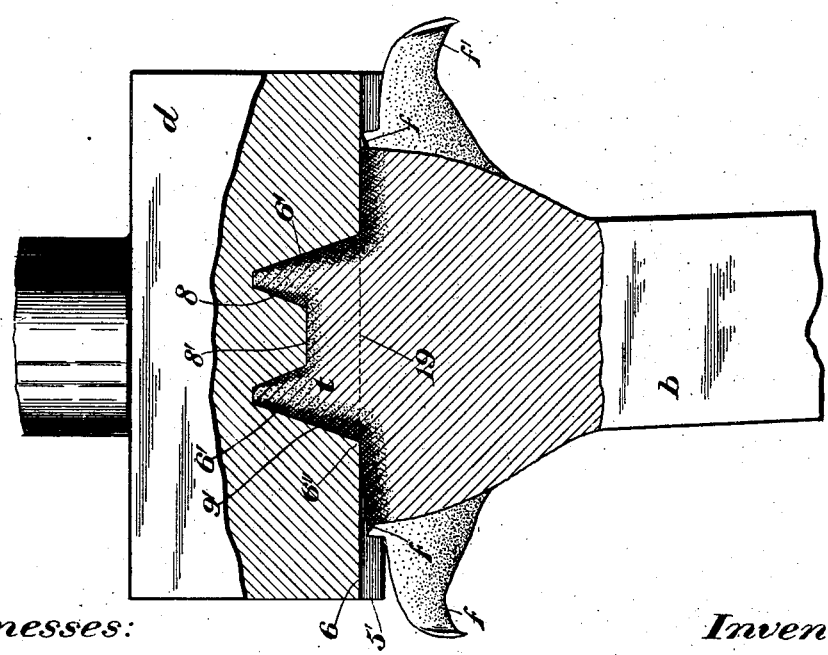
Witnesses:
Inventor:

F. H. RICHARDS.
ART OF MAKING TYPES AND TYPE BARS.
APPLICATION FILED DEC. 16, 1899.
919,215.
Patented Apr. 20, 1909.
8 SHEETS—SHEET 7.
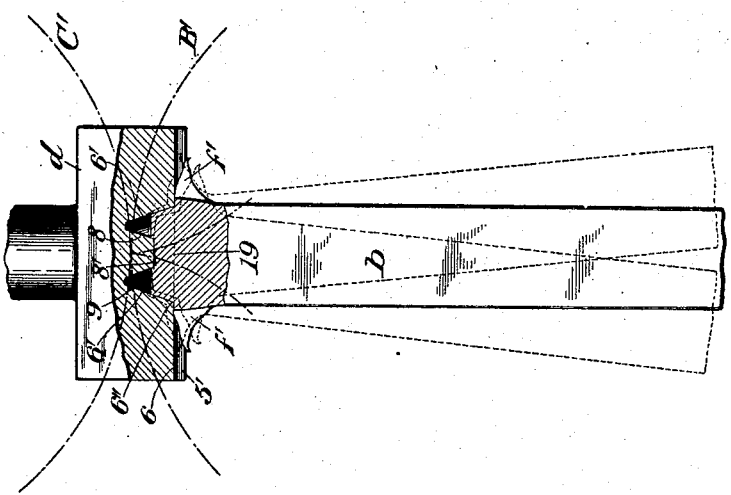
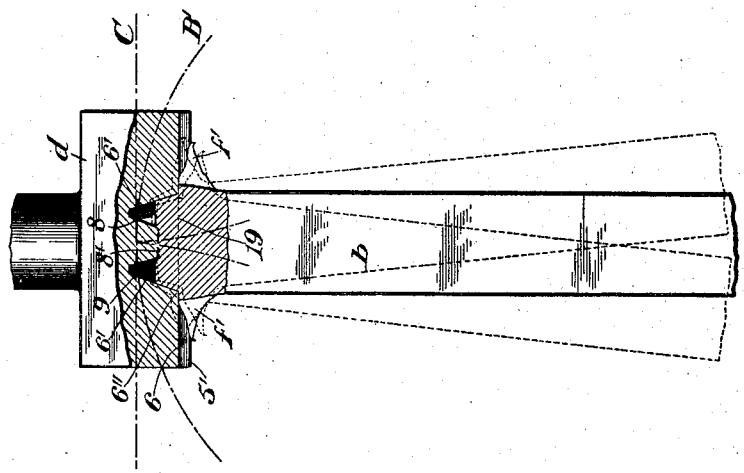

F. H. RICHARDS.
ART OF MAKING TYPES AND TYPE BARS.
APPLICATION FILED DEC. 16, 1899.

919,215.

Patented Apr. 20, 1909.
8 SHEETS—SHEET 8.

Witnesses
J. E. Davidson
E. A. Jarvis

Inventor.
F. H. Richards.

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

ART OF MAKING TYPES AND TYPE-BARS.

No. 919,215.      Specification of Letters Patent.      Patented April 20, 1909.

Application filed December 16, 1899. Serial No. 740,512.

*To all whom it may concern:*

Be it known that I, FRANCIS H. RICHARDS, a citizen of the United States, residing at Hartford, in the county of Hartford and State of Connecticut, have invented certain new and useful Improvements in the Art of Making Types and Type-Bars, of which the following is a specification.

This invention relates to the art of making type and type-bars, and especially to a method of making from a solid blank or bar of metal a type-bar adapted for use in the typographic art for printing a line of characters.

Two of the principal features which distinguish the present process are these: I avoid the necessity of setting off the finished type-blank before the die is brought into action, and I subject each type-formative portion of the blank to repeated rolling operations, preferably of such a character that not only will the face of the type be perfectly finished, but the base portion will also be finished and strengthened to such an extent as to enable it to resist greater crushing forces and last longer.

In forming a type in stock that has not been entirely set off from the body of the blank I confine endwise of the blank, a portion of the edge of a type-bar blank and compress the face of this confined portion while it is in contact with a type-die, the compressing action being exerted in such a way as to force most of the surplus stock sidewise of the type-bar blank instead of endwise thereof, this surplus material so forced out being usually removed or severed from the bar after the completion of the type. The confinement of any particular portion of the blank and the compression of that portion may be effected at a single operation. Moreover, practically all of the surplus stock within any given character-field or type-field may be forced beyond the limits of such field in a direction transverse to the blank without disturbing the stock of any adjacent character-field, the flowage being almost entirely in a direction crosswise of the type-bar blank, and the metal so forced out being afterward severed from the type-bar blank if it projects beyond the planes of the sides of the latter, as is usually the case.

The other feature which I deem of special importance in this process is the gradual formation of a type by the repeated rolling of a transverse portion of the edge of the blank while in contact with a type-die, and one of these two members being preferably reciprocated rapidly in a curvilinear path, in order that the type, during the process of formation, may be subjected to repeated rollings. In connection with this repeated rolling of the blank a feed movement may be imparted to one of the members to bring it more and more fully into engagement with the other, the result being that the type is gradually shaped to its finished form by a series of operations which co-act to finish the type perfectly and also to strengthen the body of the type very materially during the shaping of the latter. When a blank is rolled while in contact with a die it is not essential that either of these members be operated in such a way as to have a rolling movement, but merely that the movement be such that the blank will be subjected to reduction by a rolling process. In the present case the blank is rolled—that is, a rolled type is formed—by oscillating one of such members about a fixed center while in contact with the other, and all of the various operations to which the material is subjected during the formation of the type may result from two movements—viz, an oscillatory movement of one member and a feed movement of one member toward the other. These two movements may be varied as to their extent, duration, etc., and thus the operations to which the material is subjected may also be varied; but in every case where these two movements are employed each type will be formed gradually and the type-formative material will be subjected to various operations that will condense the metal and result in the formation of a wrought-metal type.

The principal operations to which the material will be subjected will be the rolling of the upper or face portion of the blank, the swaging of the face of the type, and the forging of the end walls thereof. The order in which these operations occur may of course vary, as may also the duration and extent of the same, and, of course, as any one of these factors is varied, the manner in which and the extent to which the material is operated upon and shaped will show a corresponding variation. In every case, however, I deem it desirable to shear out a type-block, usually on the edge of a type-bar blank, and to roll the material at opposite sides of such block away from the latter and preferably beyond the sides of the type-bar blank, this material, outside of the sheared type-block, containing most of the excess which it is necessary to get rid of if the types are to be formed thereon in close succession. When such material between the sides of the type-bar blank is rolled in this manner substantially all of the flowage is in a direction transverse to the blank, and there is practically no flowage lengthwise of the bar, especially when the rolled portion of the stock is substantially continuous with the remainder of the type-bar blank.

The major portion of the surplus material is gotten rid of by rolling it away from a point where it will interfere with the formation of type to a point where it will not so interfere, and preferably to a point or points beyond the sides of the bar, and the type itself is formed by shaping the material of the central type-block sheared from the mass at any given point. The shearing of this type-block and the formation of the type therefrom may be partially simultaneous or distinct and successive operations if desired. In the present case this surplus material and the type-block or type-blank are operated upon substantially simultaneously, and during the time that the excess material is being rolled beyond the sides of the bar the type-block is also being shaped to bring it to its finished form. For this reason I deem it advantageous to make use of a die so constructed as to be capable of operating upon both the type-block and the excess material at opposite sides of such block. When the blank and the die are in contact with each other, and one of them is oscillated and a feed movement is also imparted to one of them to advance it toward the other, the type-block will be sheared gradually from the mass and the surrounding material will be rolled off while the shearing operation is taking place. Moreover, the type-die will also operate upon the type-block to shape the same into a type before the completion of the shearing action, and also, of course, before all of the surrounding excess material has been rolled beyond the sides of the bar. As the rolling and feeding operations continue the base of the type-block is reduced at opposite sides of the bar and the metal condensed by a forging action and the upper portion of the type-block is forced up to fill the die, which serves to swage the face of the block and shape the face of the type. Thus not only may the die be completely filled and the face of the type perfectly formed, but the end walls of the latter will be so condensed by the forging operation as to form a base having the maximum amount of strength for supporting the head of the type and resisting any crushing force that may be exerted upon the latter when in use.

Figure 10:
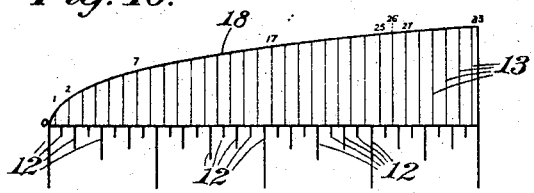
Figure 21:
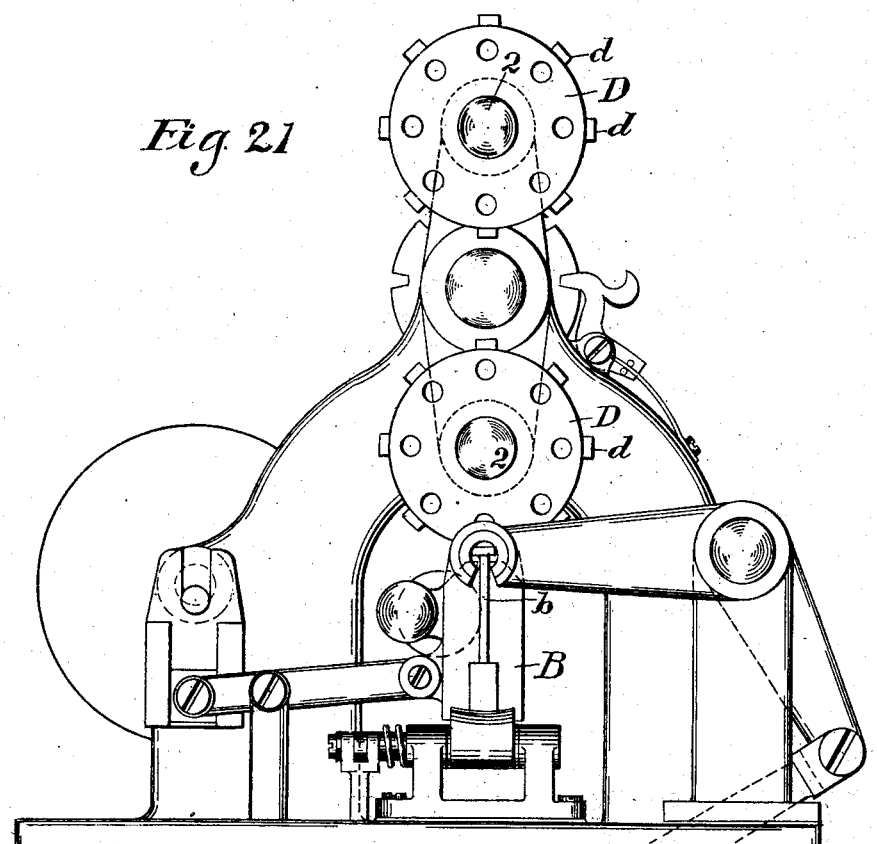
Figure 22:
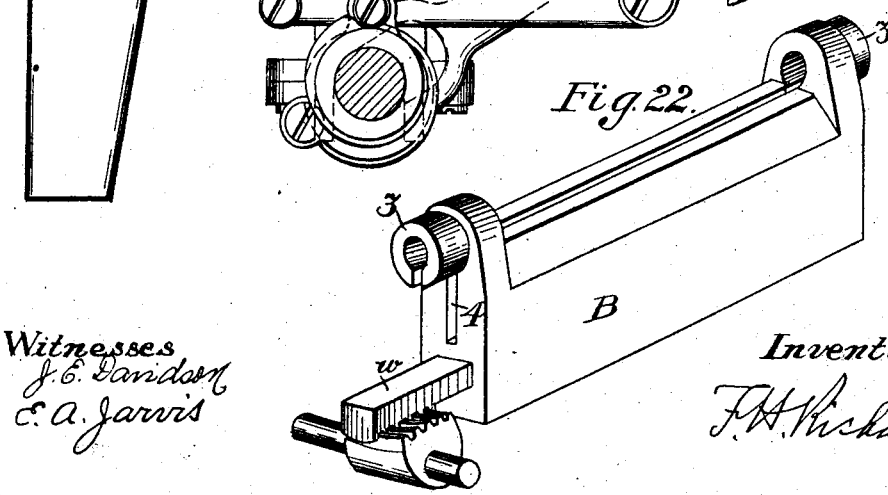

In the drawings accompanying and forming part of this application, Figures 1 and 2 are respectively a plan and a side elevation representing a type-bar made by my improved process. Fig. 3 is a plan upon a somewhat larger scale than the preceding figures of a portion of a partially-finished bar and illustrates the appearance of the finished and partially finished types on the edge of a type-bar blank. Fig. 4 is a side elevation of one end of the same, illustrating in section the operation of a die for forming a character. Figs. 5 and 6 are sectional end elevations illustrating, respectively, the initial and final stages of the operation of forming a type. Fig. 7 is a side elevation of a die-wheel and a blank-feeding wedge coöperating with a type-bar blank, the parts being shown on the same scale as in Figs. 1 and 2. Fig. 8 is a sectional end elevation of the same with the wedge omitted, and includes also an oscillatory blank-carrier. Fig. 9 is a sectional end elevation of a portion of a die and a type-bar blank, considerably enlarged, and illustrates diagrammatically certain movements and positions which will be hereinafter more fully described. Fig. 10 is a diagram illustrating the variable feed movement which I prefer to impart to one of the members when the die and the blank are in contact with each other. Figs. 11 to 18, inclusive, are views similar to Fig. 9, and illustrate successive steps in the operation of forming a type; Figs. 19 and 20 are views similar to Fig. 9 and illustrate, on a smaller scale than that figure, modifications of my improved process of forming types and type-bars; and Figs. 21 and 22 are views illustrative of a simple species of mechanism adapted to carry into effect my present improvements in the art of making types and typebars, or lines of type.

Similar characters designate like parts in all the figures of the drawings.

Two principal movements are utilized ordinarily in practicing my improved process, one of them being usually a reciprocatory movement in a curvilinear path and the other a feed movement. This reciprocatory curvilinear movement may be one of variable extent, as may also the feed movement, and in the preferred mode of practicing my invention the former will be varied only during certain stages of the operation, while the latter may vary progressively throughout substantially the whole period of operation. When these two movements are combined, as is the case in the process illustrated in the drawings of this application, not only will each type be formed gradually by repeated reductions and shapings of the type-formative material, but the amount of the work accomplished during any given period of time by any particular movement may also vary, and thus the extent to which the type-block is shaped at a given moment may also be varied, and the point or surface at which the action takes place may be moved in order to produce the desired results. The blank may be subjected to these repeated operations in any suitable manner, but while hand-operated tools may be employed for the purpose, suitable mechanism will ordinarily be used. Moreover, while different tools may be employed for operating upon each separate face of a type-block or type-blank, I have deemed it preferable to make use of a single tool or die, as when one of the two coöperating members is moved properly relatively to the other a single die is sufficient to subject the type-blank to all of the various operations which it undergoes before becoming a finished type. Any proper type-die may be employed, and this may be mounted in any desired manner, though I prefer to support one or more type-dies, such as $d$, on a carrier, such as D, which carrier may be secured to a shaft, such as 2, having a movement of revolution about another axis (not shown) and also a movement of rotation about its own axis, the resultant movement of each die when its carrier is rotating and revolving being, of course, a cycloidal one, as indicated in Fig. 8, when so mounted that the dies on the carrier may be selectively adjusted into the working point.

The blank, which may be of any material suitable for the purpose, but will usually be a type-metal of proper composition, is designated herein in a general way by $b$ and may be supported by a carrier, such as B, which in this case is mounted on a shaft 3, the axis of which passes through the die when the latter is in position to form a type. The object of this is to assure the proper formation of the type, as the face of the latter will not be perfectly shaped unless the axis of the oscillatory member is adjacent to the face of the finished type. The manner in which the blank is held by its oscillating carrier is immaterial, but in the present case the latter has guide-grooves therein, one of which is shown at 4, for receiving one end of the blank. This groove also serves as a means for guiding the blank when a feed movement is imparted thereto, as is the case herein. Any suitable means may be employed for imparting this feed movement to the blank, but I prefer to make use of a wedge, such as $w$, for supporting the blank throughout the length thereof and coacting with an incline, such as $i$, in order to raise the blank gradually. This wedge is adapted to have such a motion imparted to it as will be requisite for securing the desired character of feed movement of the parts.

It will, of course, be evident that either the blank-carrier or the die-carrier might be oscillated, and also that either of these members might be fed toward the other in order to permit the gradual formation of a type. It will also be seen that, when the major portion of the work of forming a type is accomplished by oscillating and feeding the blank, the type may or may not be partially formed by the movement of the die. In the present case, however, the parts are so disposed, and their movements are so timed relatively to each other, that each type-die will partially shape its type when brought into working position, and this partial formation of a type will be accomplished before any oscillation or feed movement of the blank takes place. The extent to which the type may be shaped will, of course, depend entirely upon the positioning of the die and the blank and the movements thereof, and a greater or lesser movement of the die toward the blank will, of course, result in a more complete, or only in a partial, shaping of the blank. In the present case the parts are so positioned that when any selected die is brought into working position by revolving the die-carrier D about an axis outside itself and simultaneously rotating said carrier about its own axis, said die will be rolled on to the blank and will compress the material of the blank substantially to the extent indicated in Figs. 5, 7, 8, and 9. This initial rolling action will be effected ordinarily by means of a die substantially of the construction shown herein, but other types of dies might be used to accomplish the same result. A special advantage of employing a die of the construction shown in the drawings is that it permits the confinement of a given portion of the type-bar blank endwise thereof by a body which operates as a single mechanical part, and indeed is actually constructed in one piece, although it has many functions that might be carried out by a large number of tools each having a single function. The principal feature of construction that distinguishes the die employed herein from other type-dies is the employment in connection with the die proper of a blade or fin at one or both sides of the die for the purpose of compressing and displacing a narrow strip of the stock at one or both sides of the point where a type is to be made, and thereby confining endwise of the blank the portion of the stock to be operated upon at any given time for the formation of a type.

The type-dies shown herein have two blades each, one of them being designated by 5 and the other by 5′, and as these blades are somewhat thin the notches made by them in the edge of the type-bar blank will be somewhat narrow, as will the strips of material forced out thereby. These blades form a means for confining between them endwise of the bar the material within any given type-field, but as there are no corresponding end walls on the die to check the flowage during compression the material will, of course, be free to flow out crosswise of the bar. Each of the blades 5 and 5' projects, usually throughout its whole length, beyond the outer wall or bottom wall 6 of its die, and hence throughout the whole period during which a type is being formed these blades serve to confine between them the mass of material that is being shaped. The bottom 6 of the die serves to roll out sidewise the major portion of the material not required for the making of a type. The end walls of the die-space, which are indicated herein by 6', intersect the bottom 6 in the usual way, as at 6'', and the edge 6'' serves to shear or cut away from the mass of the bar a type-block or type-blank containing sufficient material to fill the die-space and form a finished type; and that part of the edge of the type-bar blank which is operated upon, but is not compressed by the blades 5 and 5', and is not contained within the die-space, is obviously compressed by the bottom wall 6 of the die and is rolled off sidewise of the type-bar blank, but is always confined endwise of the bar by the die-blades just mentioned. Hence none of this surplus material is operated upon in such a manner as to force it into the field of an adjacent type, but instead all of the excess, whether it is forced out by the edges of the blades or by the bottom wall 6 of the die, flows sidewise of the blank and may afterward be severed from the bar to bring the sides of the latter into parallelism with each other.

Ordinarily the material forced out by the blades of the die, and that which is rolled off by the bottom wall 6, will to a considerable extent be gotten rid of during the preliminary stage of the operation of forming a type—that is, when the die is rolled on to the edge of the bar and into working position. The amount of the material displaced during this preliminary rolling on of the die is clearly indicated in Figs. 5, 8 and 9. According to the mode of operation herein illustrated the remainder of the surplus material that is to be gotten rid of is rolled off during the oscillating movement of the blank itself while the die is located at the working point. When the oscillation of this blank begins and a feed movement is imparted to one of the members, in this case the blank, a very different action takes place than during the preliminary rolling of the die into position. In fact, the major portion of the work of forming a type is effected during the time that the blank is oscillated, and, if desired, the whole type-forming period may be coextensive with that in which the blank is operated.

The manner in which, and the extent to which, the type-formative material confined between the die-blades is operated upon are dependent upon the oscillation of the blank and also upon the feed movement thereof. Usually a somewhat rapid feed movement will be imparted to the blank during the early stages of the oscillation thereof, in order that the type may be roughed out rapidly and afterward finished somewhat more slowly as the work approaches completion. So long as the blank is operated upon in this manner no arbitrary relation between the oscillatory movement of the blank and its feed movement need be maintained, but, for the purpose of illustrating the manner in which the blank may be operated to produce good results, I have illustrated in Fig. 10 the extent of the feed movement that may be imparted during any given period of oscillation. Here the base-line of the chart is divided into thirty-two equal parts, the divisions being indicated at 12 by heavy lines, and the intermediate light lines 13 divide each of these spaces again into two equal parts. The heavy division lines 12 are intended to indicate that during one complete type-making operation the blank may have imparted to it thirty-two semi-oscillations, or sixteen complete oscillations; that is to say, the blank may oscillate thirty-two times from a normal central position, indicated by the dotted line 14 in Fig. 9, through an angle of about six degrees to the line 16 in said figure and back again to line 14—the equivalent of this, of course, being the movement from the line 14 through a similar angle to the line 15 and back again to its central position 14—or the blank may oscillate sixteen times from the central position 14 to 16 to 15 and back again to its central position 14—the equivalent of this, of course, being a movement from 14 to 15 to 16 and back to 14. Thus those divisions on the chart in Fig. 10 which are indicated by heavy lines 12 correspond to the central position of the blank, as shown by the dotted line 14 in Fig. 9, while the divisions indicated by the light lines 13 correspond to the extreme right and left hand positions of the blank, which are indicated in Fig. 9 by lines 16 and 15, respectively. Moreover, the odd divisions 13 of this scale indicate the extreme right-hand position of the blank, as represented by the line 16 in Fig. 9, while the even divisions 13 indicate the extreme left-hand position of said blank, as indicated by the line 15 in said figure. The curved line 18 is the feed-movement curve, and is one that has been found in practice to be suitable for the purpose. This curve, it will be seen, rises rapidly during the first part of the type-forming operation and more gradually during the later stages thereof. The last line in Fig. 10, indicated by 33, represents the total feed movement which the blank has during the type-making operation; and the amount of feed movement which the blank has during any single semi-oscillation thereof will, of course, be represented by the difference in vertical height between two adjacent lines 13 marking the beginning and end of such semi-oscillation. Thus, during the first quarter-oscillation of the blank—that is, from the line 14 to the line 16 as seen in Fig. 9—the blank rises a distance measured by the first line in Fig. 10, while during the next semi-oscillation—that is, from the line 16 to the line 15—the blank rises a distance equal to the difference between the first and the second lines in Fig. 10. Of course it should be understood that the chart shown in Fig. 10 is also drawn to the proper scale to correspond to Fig. 9.

One of the most important features of my improved process is the subjection of the stock to a series of operations by means of which a type may be formed without impairing the strength of the type-formative material of the type-bar blank. It has been stated before that these blanks will be a suitable composition of type-metal, and, moreover, they may be in the form of separate type-bar blanks or a continuous strip or ribbon of metal from which the type-bars may be severed after being completed. In every case, however, wrought-metal blanks, formed ordinarily by the usual rolling operations, should be employed, as I have found in practice that cast-metal blanks are undesirable for the purpose and are not so well adapted to be wrought into shape by such operations as are employed in this process. The principal reason for this is that cast metal when rolled and forged in this manner tends to crush and crumble beneath the die instead of compressing and flowing properly, and hence the cast metal will not fill the dies so well as the wrought metal, nor form the smooth faces and sharp edges that the latter will.

The best results that I have been able to obtain in the manufacture of type-bars from cold metal have been secured by subjecting wrought-metal blanks to such operations as will tend to preserve, instead of impair, the strength of the material. The operations by which this result is obtained are those by which wrought metal is usually formed or to which wrought metal is ordinarily subjected—that is, rolling, swaging, forging, &c.—and by means of these operations types are wrought into form on the edge of a type-bar blank according to my improved process.

While, in the preferred mode of practicing my invention, a single die may be employed for performing all of the operations to which the cold-metal blank is to be subjected, yet it should be understood that the several operations to which it is necessary to subject a solid blank in order to form a wrought-metal type may be carried out in any suitable manner so long as the desired result is obtained. Here, however, the swaging of the face of the type will be performed by the face or inner wall of the die; the rolling will be accomplished chiefly by the base or outer wall of the die and by the edges of the die-blades; and the forging of the type-body will be effected principally by means of the end walls of the die, which will usually be considerably inclined in order that the type may be shaped properly and sufficient room left between such walls and the corresponding sides of the type to assure the filling of the die-space during the final stages of the type-making operation.

The manner in which a type is shaped when it is subjected to the action of the die during the oscillating and feed movements of the blank is somewhat complex, but is clearly illustrated in Figs. 9 to 18, inclusive, which illustrate the appearance of the type during the successive stages of the type-forming operation indicated by the respective figures on the feed-movement curve shown in the chart in Fig. 10. In Fig. 9 I have illustrated in dotted lines the extent to which the blank would be shaped if it were merely oscillated to its extreme right-hand and left-hand positions without being fed toward the die, but these positions are merely intended to show how much of the material of the blank would be displaced if the oscillatory movement alone were employed and are not intended to illustrate the action that does take place, for the reason that the feed movement begins at the same time as the oscillation of the blank, and hence the latter is raised at the same time that it is swung sidewise. In Fig. 9, however, I have indicated by the oblique lines 19' the extent to which the base-line 19 of the type-block or type-blank $t$, sheared out by the cutting edge 6" of the type-die, is shortened and elevated during the type-forming operation, these oblique lines indicating the results for each of the thirty-three positions on the chart in Fig. 10, but, of course, it should be understood that in Fig. 9 these oblique lines merely indicate the theoretical positions for the various movements and do not show, and are not intended to show, the exact manner in which the metal rises in the die-space and fills the same during the operation, the latter feature being illustrated approximately in Figs. 11 to 18, inclusive, for certain stages of the operation.

As the blank is swung toward the right and toward the left alternately, and is simultaneously fed toward the die, the stock at the base of the type-blank or type-block t is forged first at the right-hand side, as shown in Fig. 11, and then at the left-hand side, as shown in Fig. 12, the forging action being of course the greatest near the base of the type-block because this part of the type-block is farthest from the axis of oscillation. The forging action, however, extends up the entire length of the side being operated upon and results in a thorough compacting or condensing of the particles of the blank. The forging action being greatest at the base of the type-blank the latter will be strengthened most in the region of its base, but the strengthened base will also be connected with the face of the type by a thick layer of condensed metal thoroughly compacted by the forging operation. At the same time that this metal is compressed by the forging action of the end walls 6' of the die-space the central portion of the type-blank is forced upward into the die, owing to the resistance opposed to the forging action by the opposite walls 8 and 8' of the die-space. At each swing of the blank toward one of its extreme positions the metal so forced up tends to fill one side of the space 9, while the opposite side of said space and the space 9', formed by the withdrawal of the other side of the type-blank from the opposite wall 6' of the die-space, form an outlet through which the air confined between the type-blank and the die may escape. As the operation continues and the blank is swung first to one side and then to the other the opposite ends of the type-block, especially near the base, thereof, are more and more condensed by the forging operation, and the upper portion or head of the type-block is forced up farther and farther until the metal completely fills the die-space. The gradual increase in the areas of condensed metal resulting from the repeated forging operations is indicated approximately in Figs. 11 to 18, inclusive, principally by cross-hatching, but partly by stippling, while those areas which are merely swaged as the one member is fed toward the other are indicated by stippling alone. As the two movements—viz., the oscillation and the feed—continue the cutting edge 6" of the die shears into the metal of the type-bar blank and gradually completes the cutting out of the type-block or type-blank from the mass of the metal. This type-blank it will be seen is not completely sheared from the type-bar blank until the actual completion of the making of the type. In other words the shearing of the type-blank and the formation of a type from that type-blank are substantially coincident when my improved process is carried out in the manner just described. Each time that a feed movement and an oscillation occur an additional portion of the surplus material confined between the die-blades 5 and 5' is forced out sidewise of the blank both by the lower edges of these blades and by the bottom wall 6. After such portion of the surplus has been forced out sidewise in this manner the cutting edge 6" at the next operation shears farther into the body of the blank, and the metal at the point at which such cutting edge previously operated is forced farther out toward or beyond the side of the bar. The result is that when the type is completed those faces of the surplus material which are in contact with the outer wall 6 of the die and are rolled throughout present the appearance of plane faces cut by a series of parallel lines or serrations, as shown clearly in Fig. 18, and also as seen in Fig. 3. These lines correspond in contour to that of the cutting edge by which they are formed.

In order to fill the die completely and thus form a perfectly finished type it is desirable to reduce the angle of oscillation of the blank during the latter portion of the type-forming operation and to finish the type by a simple feed movement after the oscillations have ceased. The manner in which the material is shaped when the blank is operated in this way is clearly shown in Figs. 15 to 18, inclusive, the first three of which show how the forging action gradually decreases, owing to the gradual reduction of the angle of oscillation of the blank, and also show how the clear space at that side of the base of the blank, which is not being forged gradually decreases in size, and hence how the die-space gradually fills up more and more as the operation approaches completion. The numerals 25', 26', 27' and 28' in Fig. 9 indicate the respective angular positions to which the blank is oscillated as the swinging movement thereof is progressively decreased, and these positions correspond to the twenty-fifth, twenty-sixth, twenty-seventh, and twenty-eighth positions represented on the chart in Fig. 10. During the final stages of the operation when the oscillation ceases the die will operate principally as a means for swaging the face of the type to its finished form. Of course when the die and the blank are separated they should withdraw from one another in such a manner as not to mar the finished type.

It will be apparent from the foregoing that during the early stages of the type-making operation one of the two members which coöperate to form the type will be reciprocated in a curvilinear path of fixed length, which will vary and gradually decrease until it disappears entirely just before the operation is concluded, the arc in which the blank oscillates in this case decreasing from one of about six degrees at each side of a central position until the oscillation ceases. Thus not only may the feed movement of one of these members be varied while the type is being formed, but the oscillation of the swinging member may also be varied during the period of the variable feed movement and may cease entirely before the latter.

The location of the axis of oscillation may vary somewhat in practice, but in every case I deem it desirable that it pass either through or below the face of a finished type. It is so shown at 21 in Fig. 9, and as there illustrated is disposed longitudinally of the type-bar blank and fixed relatively to the face of the die while the latter and the blank are in contact with each other during the operation of forming a type.

After any one type has been formed on the type-bar blank another may be shaped in substantially the same way, as is clearly shown in Fig. 4, but in every case the blade or fin 5 should be so located as to lie close to the side of the next, adjacent, finished type, in order that the types when finished may be sufficiently close to one another. The fins $f$ and $f'$, which are rolled off from the sides of the bar by the bottom wall of the die and by the edges of the blades 5 and 5', respectively, (chiefly by the surfaces 6 and 5',) may be removed at any proper time and in any suitable manner, a pair of cutting-tools, such as $c$, being shown herein for the purpose, these preferably operating after a series of types has been formed. It should, of course, be understood that the spaces between groups or letters of words may be formed in any suitable way, but preferably by means of blank dies (not shown) which will roll the metal off in substantially the manner just described, but will leave the faces of the blank spaces or space types considerably below the faces of the others, as illustrated in Fig. 2. These blank spaces may be of any suitable width and, of course, the letters themselves will be of varying widths, but in all cases it is desirable to form between the words spaces of such width as to make type-bars of uniform lengths, whether the blank spaces be of the same width or of varying widths, thus assuring the formation of type-bars having the types thereon properly composed and spaced.

In Figs. 19 and 20 I have illustrated two modifications of my improved process, in which instead of employing an oscillatory movement for actuating one of the members, said member, in this case the blank, is operated by a rolling movement, the part by which the blank is carried being indicated in dotted lines by B', while the surfaces against which the carrier B' rolls are indicated in dotted lines by C and C', respectively. The surface C is a plane surface, while the surface C' is a curved surface, the radius of which will usually be the same as that of the carrier B'. The principal difference between the rolling movement shown in Fig. 19 and that illustrated in Fig. 20 is that in the latter the cycloidal movement is substantially twice as great as in the former when the blank is moved through a given distance. The dotted lines in both of these figures show the positions which would be assumed by the blank if it were merely rolled to its respective extreme positions without being fed toward the die. From these views it will be seen that one of the principal differences between the oscillating process of forming a type and the rolling process is that in the latter the blank never turns about a fixed axis, but moves bodily in a cycloidal path, it following portions of two branches of the cycloid when reciprocated in the manner shown. It will be obvious, therefore, that during the formation of the type by the rolling process that member which is movable in a cycloidal path, usually the blank, not only swings and feeds but has a third movement, which results in the material being operated upon in quite a different manner. This, and other differences in the process, need not be more fully set forth in the present specification, as they are fully described in, and form the subject-matter of, a companion application filed by me March 1, 1907, Serial No. 359,982, to which reference may be made.

Having thus described my invention, I claim—

1. That improvement in the art of making a type, which consists in subjecting opposite walls of that portion of the blank upon which the type is to be made to a progressive forging operation decreasing in the extent thereof as the type is brought nearer and nearer to a finished condition.

2. That improvement in the art of making a type, which consists in subjecting opposite walls of that portion of the blank upon which the type is to be made to a progressive forging operation decreasing in the extent thereof as the type is brought nearer and nearer to a finished condition, said forging operation being applied transversely to the line joining the character field of the forming type with the character field of the adjacent type.

3. That improvement in the art of making a type by subjecting a blank to the compressing action of a type-die, which consists in confining endwise of the blank a portion of the edge of a type-bar blank, and imparting to one of said members a curvilinear movement while the die is in contact with the confined portion of the blank.

4. That improvement in the art of making a type by subjecting a blank to the compressing action of a type-die, which consists in confining endwise of the blank a portion of the edge of a type-bar blank, and imparting to one of said members a variable movement in a curvilinear path while the die is in contact with the confined portion of the blank.

5. That improvement in the art of making a type bar, by compressing each successive type carrying portion of the edge of a typebar blank in contact with the type-die, which consists in reciprocating one of said members in a curvilinear path transverse to the blank, and thereby forming a type.

6. That improvement in the art of making a type by compressing the edge of the type-bar blank in contact with a type die, which consists in reciprocating one of said members in a curvilinear path and at a high rate of speed while the members are in contact, the path of the reciprocation gradually decreasing in length as the type is brought nearer and nearer to a finished condition.

7. That improvement in the art of making type, which consists in confining endwise of the blank a portion of the edge thereof, in initially compressing said confined portion by a type die to a relatively great extent, and in finally compressing the same to a comparatively less extent, thereby forcing surplus material beyond the sides of the blank.

8. That improvement in the art of making a type, which consists in moving one of the type-making members in a curvilinear path of gradually decreasing length while in contact with the other, and simultaneously feeding one of the members toward the other.

9. That improvement in the art of making a series of type upon a blank by compressing each successive type bearing portion of the edge of a type-bar blank in contact with a type-die, and in moving one of said members in a curvilinear path while in contact with the other, and simultaneously feeding one of said members toward the other with a variable movement, and thereby forming a type.

10. That improvement in the art of making a type, which consists in feeding one of the type-making members toward the other while in contact therewith, and in reciprocating one of said members in a curvilinear path of gradually decreasing length during the early stages of such feed movement.

11. That improvement in the art of making a type by compressing the edge of a type-bar blank in contact with a type-die, which consists in feeding one of said members toward the other while in contact therewith, and reciprocating one of said members in a curvilinear path of variable length during a portion of the feed movement, and thereby forming a type.

12. That improvement in the art of making a type by compressing the edge of a typebar blank in contact with a type-die, which consists in feeding one of said members toward the other while in contact therewith, and reciprocating one of said members, during the early stages of such feed movement, first in a curvilinear path of fixed length and then in a curvilinear path of progressively-decreasing length, and thereby forming a type.

13. That improvement in the art of making a type on the edge of a typebar blank, which consists in oscillating a blank in an arc of variable length while in contact with a type-die, and thereby forming a type.

14. That improvement in the art of making a type on the edge of a typebar blank, which consists in oscillating a blank in an arc first of fixed, and then of progressively-decreasing length while in contact with a type-die, and thereby forming a type.

15. That improvement in the art of making a type bar by compressing the edge of a type-bar blank at each successive type bearing portion in contact with a type-die, and feeding the blank toward the die while in contact therewith, and oscillating the blank during a portion of the feed movement, and thereby forming a type.

16. That improvement in the art of making a type by compressing the edge of a typebar blank in contact with a typedie, which consists in feeding the blank toward the die while in contact therewith, and oscillating the blank in an arc of variable length during a portion of the feed movement, and thereby forming a type.

17. That improvement in the art of making a type by compressing the edge of a typebar blank in contact with a typedie, which consists in feeding the blank toward the die while in contact therewith, and oscillating the blank, during the early stages of such feed movement, first in an arc of fixed length and then in an arc of progressively-decreasing length, and thereby forming a type.

18. That improvement in the art of making a line of type, which consists in subjecting each successive type-formative portion of the blank to the gradually decreasing crosswise forging action of a proper die.

19. That improvement in the art of making a type by compressing the edge of a typebar blank in contact with a typedie, which consists in feeding the blank and die toward each other at a speed decreasing in the latter stages of such feed and in oscillating the one relatively to each other with an amplitude of oscillation also decreasing in the latter stages of such oscillation.

20. That improvement in the art of making a type by compressing the edge of a typebar blank in contact with a typedie, which consists in feeding the blank and die toward each other at a speed decreasing in the latter stages of such feed and in oscillating the one relatively to the other with a rapidity also decreasing in the latter stages of such oscillation.

21. That improvement in the art of making a type on a typebar blank, which consists in subjecting its type-formative portion to a forging treatment applied transversely to the typebar blank, such treatment gradually decreasing in extent as the type nears its finished condition.

22. That improvement in the art of making a line of type, which consists in subjecting the successive type-formative portions of the blank each to a forging treatment applied transversely to the blank, each such treatment gradually decreasing in extent as the type nears its finished condition.

23. That improvement in the art of making a line of type, character by character, which consists in working the blank by the forging action of the die at each of a series of positions, and uniformly varying the pressure throughout the working for each of the several characters.

24. That improvement in the art of making a type, which consists in subjecting the blank to a forging treatment gradually decreasing in extent as the type nears its finished condition.

25. That improvement in the art of making a line of type, which consists in subjecting each successive type bearing portion of a typebar blank to the gradually decreasing forging action of a proper die.

26. That improvement in the art of making a type on a type-bar blank, which consists in subjecting it to a forging treatment applied transversely to the typebar blank, such treatment gradually decreasing in extent as the type nears its finished condition.

27. That improvement in the art of making a line of type, which consists in subjecting the successive portions of the blank each to a forging treatment applied transversely to the blank, each such treatment gradually decreasing in extent as the type nears its finished condition.

28. That improvement in the art of making a line of type, character by character, which consists in working the blank by the forging action of the die, at each of a series of character positions, and uniformly varying the intensity of pressure throughout the working for each of the several characters.

29. That improvement in the art of making a line of type which consists in variably working the blank by the successive forging action of each of a series of dies.

30. That improvement in the art of making types which consists in forcing the die and the type blank together with a predetermined variation of pressure.

31. That improvement in the art of making a line of type which consists in working the blank by the forging action of each of a series of dies each at a uniform variable pressure.

32. That improvement in the art of making a line of type which consists in subjecting the successive type blanks each to a uniform forging treatment gradually decreasing in extent as the type nears its finished condition.

33. That improvement in the art of making a line of type which consists in subjecting the successive type blanks each to a uniform treatment decreasing in extent as the type nears its finished condition.

34. That improvement in the art of making a line of type which consists in subjecting the successive type-formative portions of the blank to a uniform forging treatment gradually decreasing in extent as the type nears its finished condition.

35. That improvement in the art of making a line of type, which consists in subjecting each successive type-formative portion of the blank to a treatment uniformly gradually decreasing in extent as it nears its completion.

36. That improvement in the art of making a line of type, which consists in variably working the blank portions individually by the uniform action of the die varying in extent as each type nears completion.

FRANCIS H. RICHARDS.

Witnesses:
C. A. WEED,
JOHN O. SEIFERT.